(12) United States Patent
de Souza et al.

(10) Patent No.: US 12,480,611 B2
(45) Date of Patent: Nov. 25, 2025

(54) THERMAL BARRIER CURTAIN SYSTEMS ESPECIALLY USEFUL FOR THERMALLY ISOLATING INTERIOR CABIN ZONES OF CARGO TRANSPORT AIRCRAFT

(71) Applicant: EMBRAER S.A., São José dos Campos-SP (BR)

(72) Inventors: Demetrius Rocha de Souza, São José dos Campos-SP (BR); Carlos Eduardo Caetano de Souza, São José dos Campos-SP (BR); Everton Luis Salles, São José dos Campos-SP (BR); Marcio Morais de Melo, São José dos Campos-SP (BR)

(73) Assignee: EMBRAER S.A., São José Dos Campos (BR)

( * ) Notice: Subject to any disclaimer, the term of this patent is extended or adjusted under 35 U.S.C. 154(b) by 154 days.

(21) Appl. No.: 18/081,038

(22) Filed: Dec. 14, 2022

(65) Prior Publication Data

US 2023/0194039 A1     Jun. 22, 2023

Related U.S. Application Data

(60) Provisional application No. 63/290,832, filed on Dec. 17, 2021.

(51) Int. Cl.
  *F16L 59/02*     (2006.01)
  *B64D 9/00*     (2006.01)

(52) U.S. Cl.
  CPC .............. *F16L 59/026* (2013.01); *B64D 9/00* (2013.01); *F16L 59/028* (2013.01)

(58) Field of Classification Search
  CPC ........ F16L 59/026; F16L 59/028; B64D 9/00; B64D 11/0023; B64C 1/403; B64C 1/40; B64C 1/406
  See application file for complete search history.

(56) References Cited

U.S. PATENT DOCUMENTS

| | | |
|---|---|---|
| 1,845,688 A | 2/1932 | Untiedt et al. |
| 6,551,951 B1 * | 4/2003 | Fay .................... B32B 27/12 442/79 |

(Continued)

FOREIGN PATENT DOCUMENTS

DE     102020002099 A1 * 10/2021

*Primary Examiner* — Brian Handville
(74) *Attorney, Agent, or Firm* — NIXON & VANDERHYE P.C.

(57) ABSTRACT

Thermal barrier curtain systems include a thermal barrier curtain and port and starboard anchor/hoist strap assemblies. The thermal barrier curtain includes forward and aft flexible air-impervious panels which are sealed about peripheral edges thereof so as to define a central thermal barrier region and separator elements positioned between and attached to the forward and aft panels within the central thermal barrier region so as to define a dead air space therebetween. Each of the port and starboard anchor/hoist strap assemblies includes an elongate strap, upper and lower attachment members positioned at opposed upper and lower ends of the elongate strap, an upper attachment loop adapted to receive and be attached to a respective connection element of the thermal barrier curtain, and an intermediate retaining loop which is adapted to receive and be attached to the lower attachment member of the anchor/hoist assembly.

11 Claims, 13 Drawing Sheets

(56) References Cited

U.S. PATENT DOCUMENTS

| | | | |
|---|---|---|---|
| 7,820,570 B2 | 10/2010 | Holland et al. | |
| 8,479,801 B2 * | 7/2013 | Holland | E06B 5/00 |
| | | | 160/180 |
| 2004/0256520 A1 * | 12/2004 | Guard | B64C 1/066 |
| | | | 244/117 R |
| 2008/0102721 A1 * | 5/2008 | Holland | B32B 33/00 |
| | | | 264/472 |
| 2011/0067951 A1 * | 3/2011 | Muller | F16L 55/035 |
| | | | 181/284 |
| 2011/0309197 A1 * | 12/2011 | Holvoet | H02G 3/32 |
| | | | 244/131 |
| 2013/0340954 A1 * | 12/2013 | Kauffman | B64D 11/0023 |
| | | | 160/405 |
| 2017/0096295 A1 * | 4/2017 | Pherson | B65D 90/22 |
| 2017/0283031 A1 * | 10/2017 | Borumand | B60R 13/08 |
| 2018/0201359 A1 * | 7/2018 | Zaman | B64C 1/067 |
| 2019/0100298 A1 * | 4/2019 | Gladstone | F16L 59/028 |
| 2021/0129973 A1 * | 5/2021 | Voicu | B32B 27/12 |

* cited by examiner

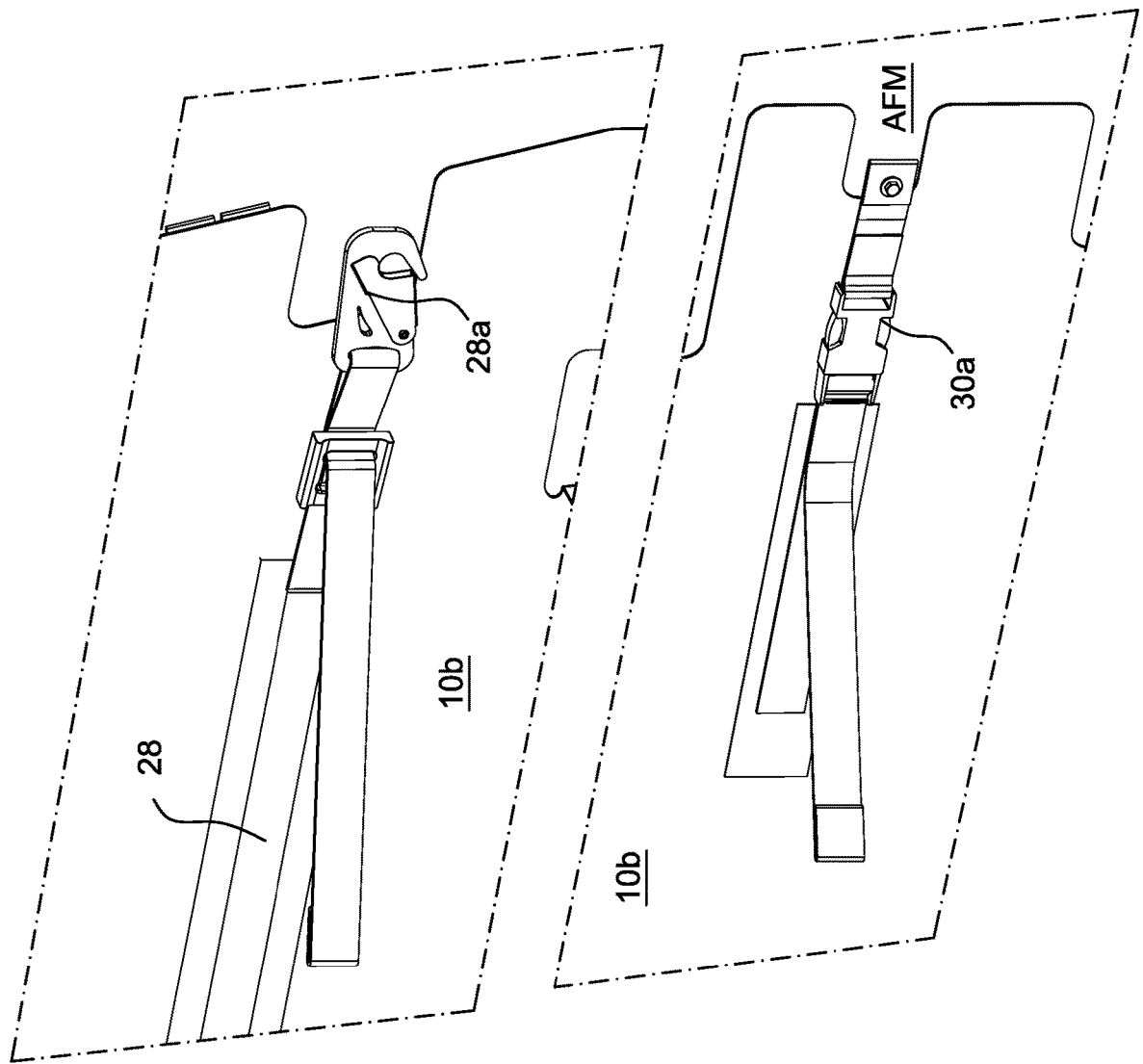

THERMAL BARRIER CURTAIN SYSTEMS ESPECIALLY USEFUL FOR THERMALLY ISOLATING INTERIOR CABIN ZONES OF CARGO TRANSPORT AIRCRAFT

CROSS-REFERENCE TO RELATED APPLICATIONS

This application is based on and claims domestic priority from U.S. Provisional Application Ser. No. 63/290,832 filed on Dec. 17, 2021, the entire contents of which are expressly incorporated hereinto by reference.

FIELD

The embodiments disclosed herein relate generally to curtains which provide a thermal barrier between interior aircraft cabin zones. In preferred forms, the thermal barrier curtain systems described herein are especially useful to provide thermal isolation between interior cabin zones associated with a cargo aircraft.

BACKGROUND

There are different types of curtains that are conventionally employed within an aircraft cabin to accomplish a variety of requirements. For example, curtains can be used to provide privacy, divide the cabin into interior layouts, obstruct light from windows and promote sound comfort in the rest area. Aircraft are sometimes provided with a thermal barrier curtain which functions to provide a barrier to cold airstreams that propagate to the surrounding interior environment in the close proximity to doors and other interior zones within the cargo compartment when occupants are positioned within the compartment. Thus, thermal barrier curtains are of a specialized design that functions so as to provide thermal comfort to the crew and passengers in the interior cargo compartment of a cargo aircraft during long missions.

As is well known, conventional cargo aircraft feature large aft cargo doors to allow for relatively quick loading and unloading of cargo and personnel. Heat loss through the door structures and nearby fuselage during flight thereby results in low temperatures in the vicinity of the doors often characterized by temperatures close to or below the water freezing point.

Cargo aircraft certified for operation with occupants inside the cargo compartment have a characteristic issue concerning temperature control, resulting from cold airstreams close to the large aft cargo doors in the compartment. The cold airstream propagates to the surrounding positions in close proximity to the aft cargo doors and to the other zones within the cargo compartment, typically at lower heights closer to the cargo floor, causing large temperature gradients for any occupant within the cargo compartment thereby resulting in poor thermal comfort for the occupants.

It would therefore be highly desirable if a thermal barrier curtain could be provided which could thermally isolate the cargo doors of the cargo aircraft from other interior zones of the cargo compartment within a cargo aircraft. It is towards fulfilling such a need that the embodiments disclosed herein are directed.

SUMMARY

Generally, the embodiments disclosed herein are directed toward interior curtains to provide thermal comfort to interior zones of a cargo compartment of a cargo aircraft. The thermal barrier curtain according to embodiments disclosed herein is designed to provide a barrier to the cold airstreams and thereby function as thermal insulation wall between adjacent zones within the cargo compartment. This feature allows adequate thermal comfort to be maintained in cargo compartment of the cargo aircraft that is adapted to operate with occupants inside the compartment. The thermal barrier curtain according to the embodiments disclosed herein thereby creates a compartmentation inside the interior fuselage volume of the cargo compartment between an aft critical area and forward occupied areas. The curtain therefor functions as a thermal barrier to the cold airstreams generated in the region of the aft cargo door thereby providing essentially a thermal insulation wall between the aft zone of the cargo compartment and forward zones thereof.

According to preferred embodiments, the thermal barrier curtain systems will include a thermal barrier curtain and port and starboard anchor/hoist strap assemblies adapted to being fixed to adjacent structures of the cargo aircraft. The thermal barrier curtain may include forward and aft flexible air-impervious panels which are sealed about peripheral edges thereof so as to define a central thermal barrier region and separator elements positioned between and attached to the forward and aft panels within the central thermal barrier region so as to define a dead air space therebetween. Each of the port and starboard anchor/hoist strap assemblies includes an elongate strap, upper and lower attachment members positioned at opposed upper and lower ends of the elongate strap, an upper attachment loop adapted to receive and be attached to a respective connection element of the thermal barrier curtain, and an intermediate retaining loop which is adapted to receive and be attached to the lower attachment member of the anchor/hoist assembly.

The thermal barrier curtain may further include port and starboard tab regions joined to port and starboard sides of the forward and aft flexible air-impervious panels adjacent to port and starboard edges of the central thermal barrier region thereof, respectively. Each of the port and starboard connection elements may comprise port and starboard J-hooks, respectively, to allow connection to the attachment loops of the port and starboard anchor/hoist assemblies.

The forward and aft flexible air-impervious panels are most preferably embodied in the form of an elastomeric polymer material impregnated within, laminated to or coated onto one or more fabric layers. Each of the separator elements may thus be formed from an elastomeric foam material.

The port and starboard anchor/hoist strap assemblies preferably include a strap adjuster which joins respective sections of the elongate strap to one another near the lower attachment member so as to establish a strap tail that allows length adjustment of the elongate strap. The elongate strap may be formed of a flexible fabric strap of sufficient strength to support weight of the thermal barrier curtain. Each of the upper attachment loop and the intermediate retaining loop may be a fabric, metal or plastic loop fixed to the elongate strap.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 5A and 5B are enlarged perspective views of exemplary port side intermediate connectors for the thermal barrier curtain shown in FIG. 3;

DETAILED DESCRIPTION OF EMBODIMENTS

Figure 1:
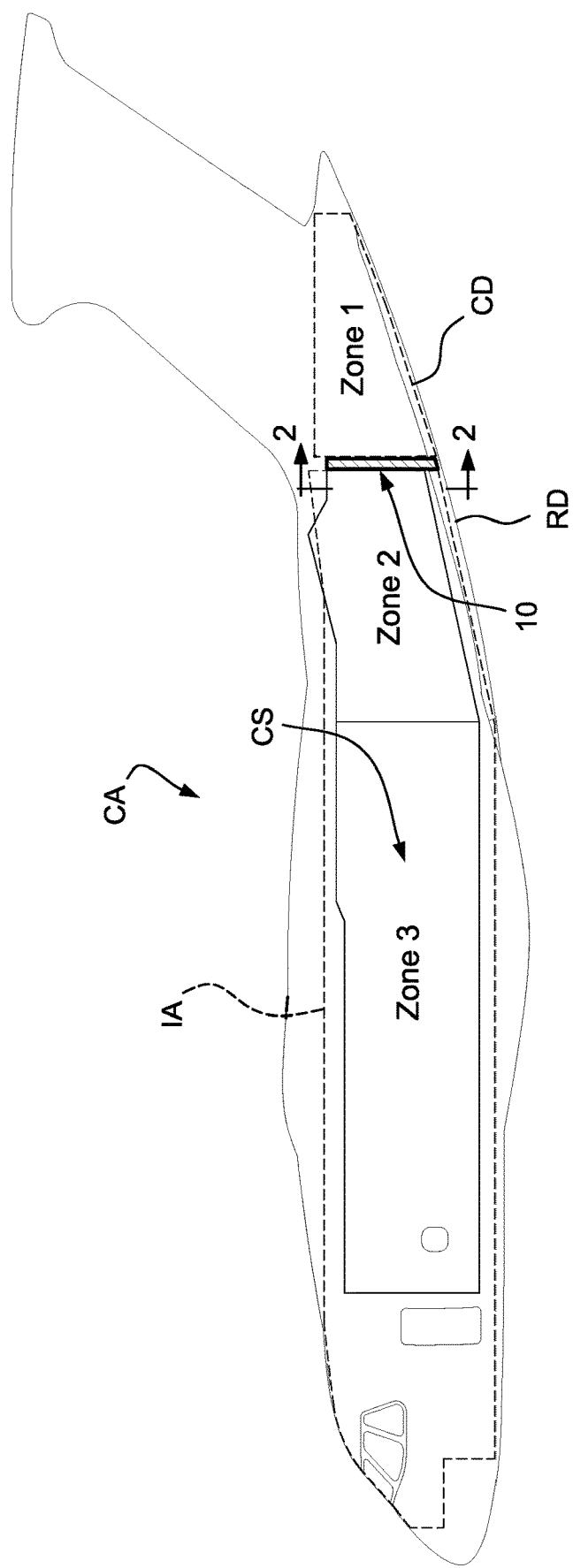
FIG. 1 is an x-ray side elevational view of the cargo compartment associated with a cargo aircraft equipped with a thermal barrier curtain according to an embodiment of the invention described herein.

Accompanying FIG. 1 depicts a typical cargo aircraft CA having an aft cargo door DC and an oppositely facing articulated aft cargo ramp door RD. In accordance with the embodiments disclosed herein, a thermal barrier curtain 10 may be positioned transversely across the interior cargo space CS at the junction between the terminal ends of the ramp and cargo doors RD and CD, respectively, so as to establish a thermal insulation area IA which may include thermally conditioned Zones 2 and 3 that are occupied by personnel forwardly of the unoccupied aft thermal critical area defined by Zone 1. The thermal critical area of Zone 1 may thus experience significantly lower interior cabin temperatures during flight (e.g., from about 0° C. to −10° C.) as compared to the interior cabin temperatures (e.g., about 20° C. to about 25° C.) in the thermally conditioned personnel occupied Zones 2 and 3. It will be appreciated that the entire interior of the fuselage of the cargo aircraft, including the cargo space CS and its Zones 1-3, will be pressurized by the aircraft's on-board pressurization system during flight at altitudes requiring pressurization for the occupants.

Figure 2:
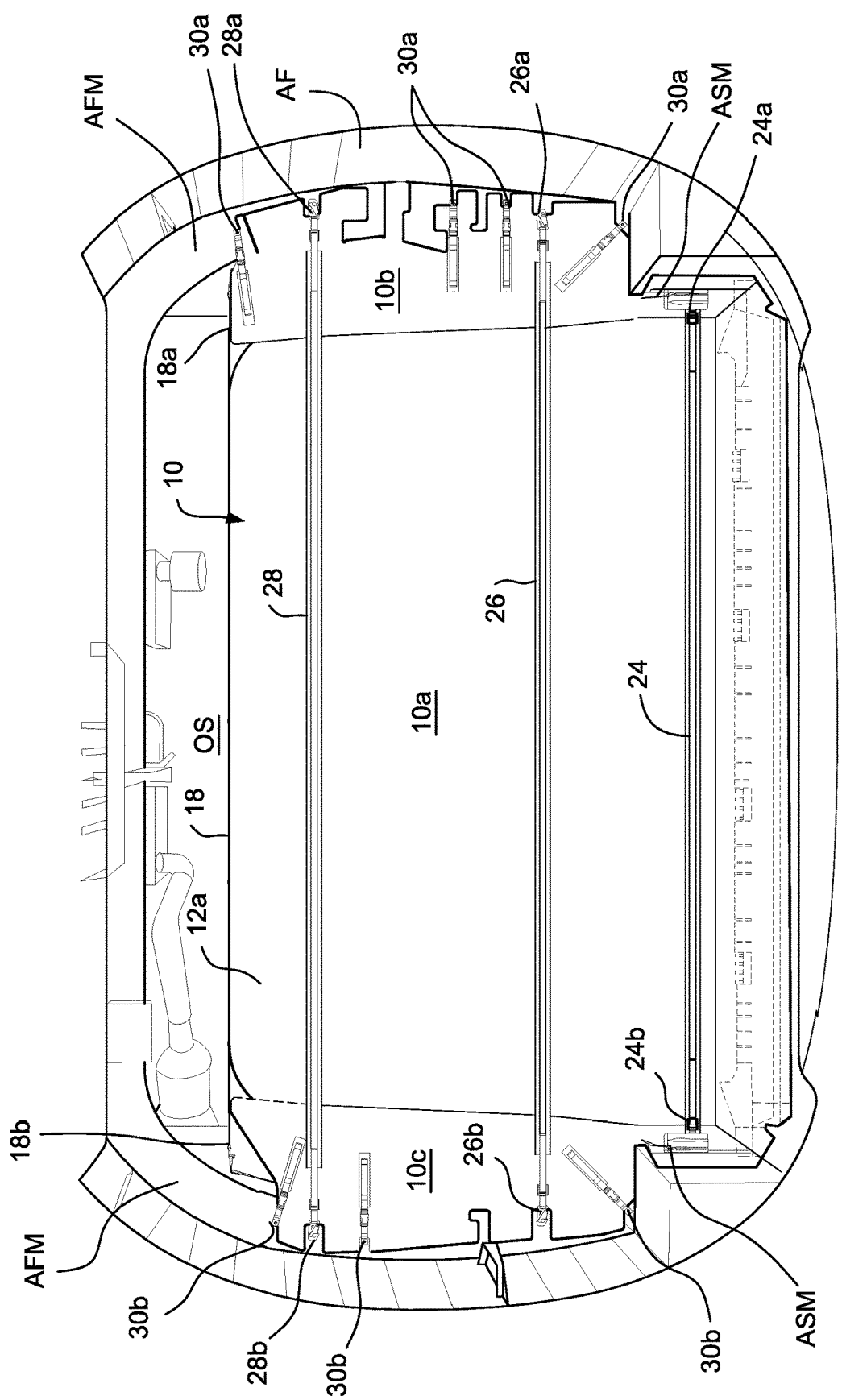
FIG. 2 is an interior aft-looking elevational view of the thermal barrier curtain taken along lines 2-2 in FIG. 1.
Figure 3:
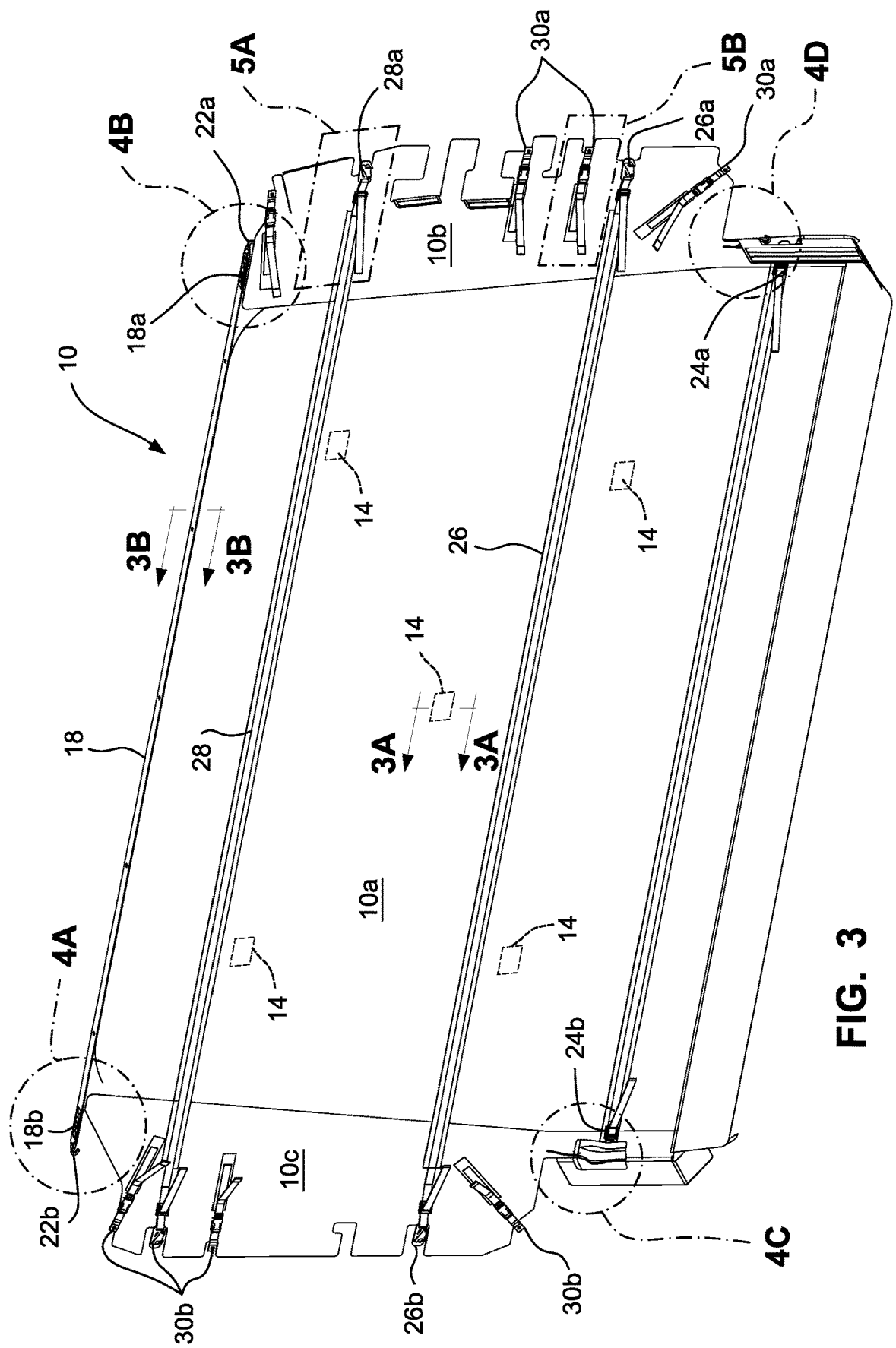
FIG. 3 is an aft-looking perspective view of the thermal barrier curtain shown in FIG. 2 disconnected from its lateral supports.
Figure 3B:
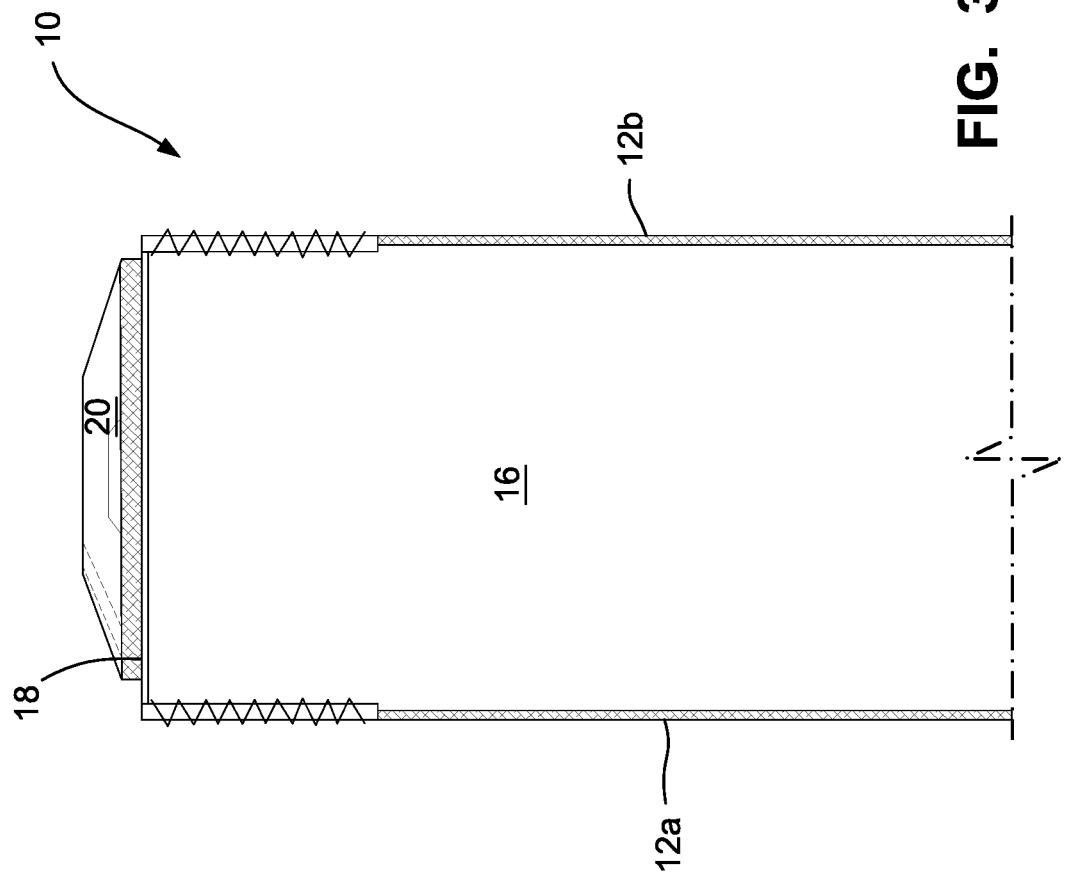
FIGS. 3A and 3B are enlarged cross-sectional views of portions of the thermal barrier curtain taken along lines 3A-3A and 3B-3B in FIG. 3, respectively.
Figure 3A:
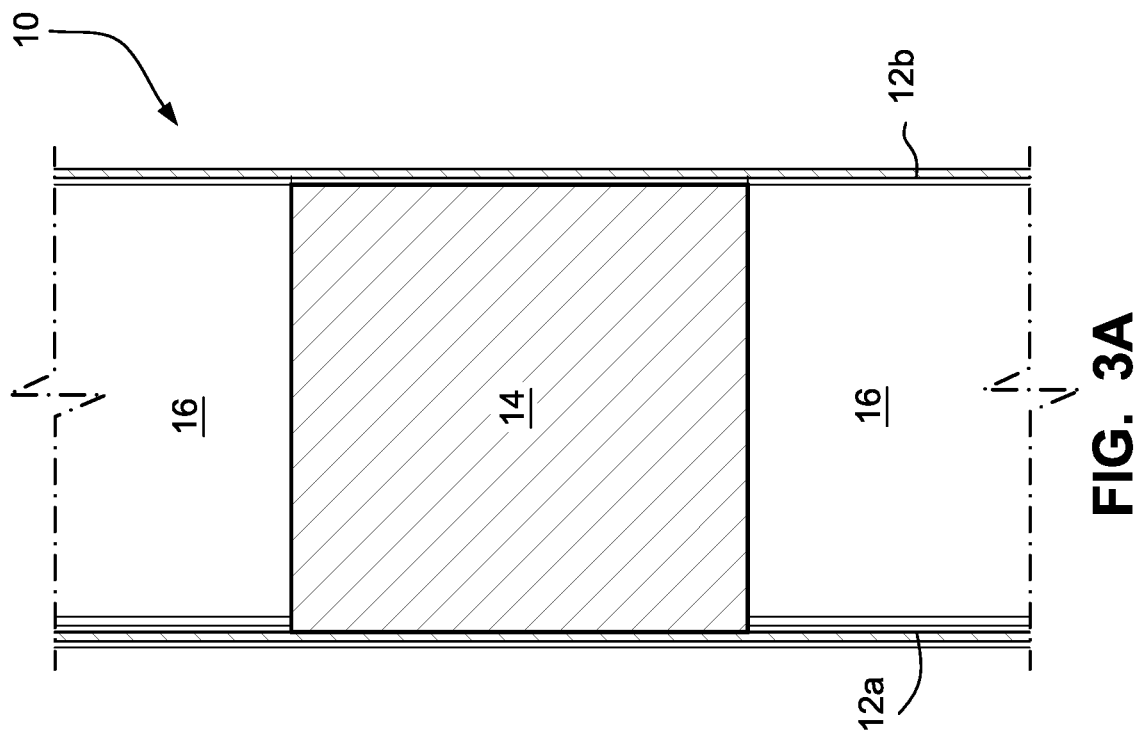

Accompanying FIGS. 2 and 3 depict the thermal barrier curtain 10 in accordance with an embodiment of this invention. As shown, the thermal barrier curtain 10 defines a central thermal barrier region 10a attached to port and starboard (in relation to the directional flight of the cargo aircraft CA) side tab regions 10b, 10c, respectively. As is shown in greater detail in FIGS. 3A and 3B, the thermal barrier curtain 10 is preferably formed by air impervious flexible forward and aft panels 12a, 12b which are separated from one another by separator elements 14. The panels 12a, 12b are sealed along the entirety of the peripheral edges of the central air cushion region 10a so as to define a dead air space 16 therebetween. The dead air space 16 will thus serve to provide thermal insulation between the cold volume of Zone 1 and the temperature controlled volume of the immediately adjacent Zone 2 and thus also Zone 3. As is also shown in FIG. 2, the thermal barrier curtain 10 is of a sufficient height so that the bottom edge thereof may be positioned between the junction of the forward facing cargo door CD and the aft facing ramp door RD to provide a thermal barrier to cold air entering the interior space in Zone 1 of the aircraft fuselage and attempting to infiltrate adjacent Zone 2 along the cargo floor, but defines an upper open space OS with the fuselage AF of the cargo aircraft CA to allow pressurization equalization between all of the Zones 1-3 (see FIG. 2).

Any suitable air-impervious flexible fabric or film may be employed for the panels 12a, 12b, including rubber or similar elastomeric polymers that may be impregnated, laminated or coated onto one or more fabric layers or impervious films or laminates formed of such rubber or like polymers. See in this regard, U.S. Pat. Nos. 1,845,688 and 7,820,570, the entire contents of which are expressly incorporated hereinto by reference. The separator elements 12 are most preferably formed of a relative dense elastomeric foam material so as to be somewhat compressible but yet expandable to maintain the dead air space 16 between the flexible panels 12a, 12b when the thermal barrier curtain 10 is in use.

Figure 4B:
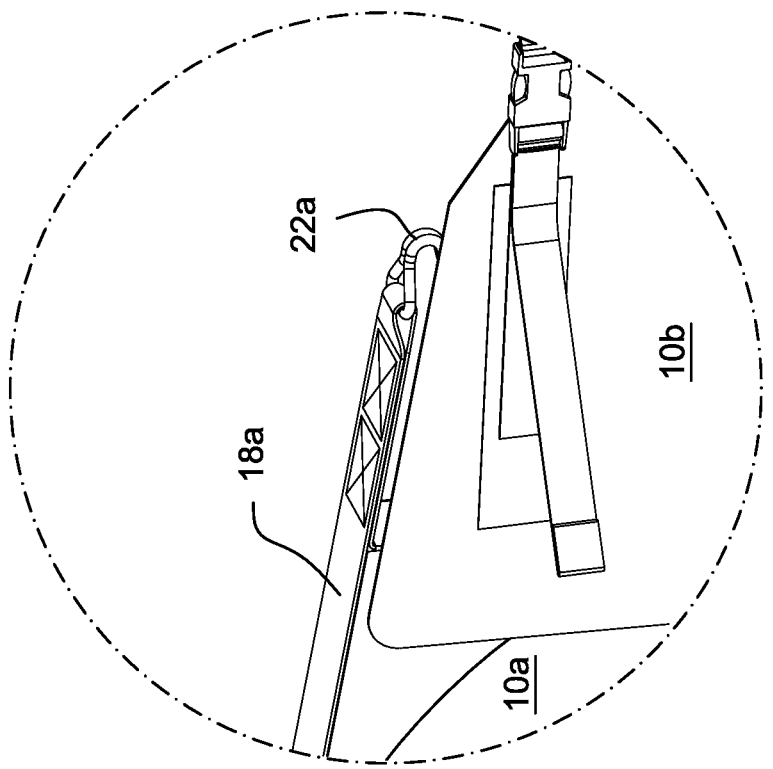
FIGS. 4A-4B are enlarged perspective views of the upper lateral connectors for the thermal barrier curtain shown in FIG. 3.
Figure 4A:
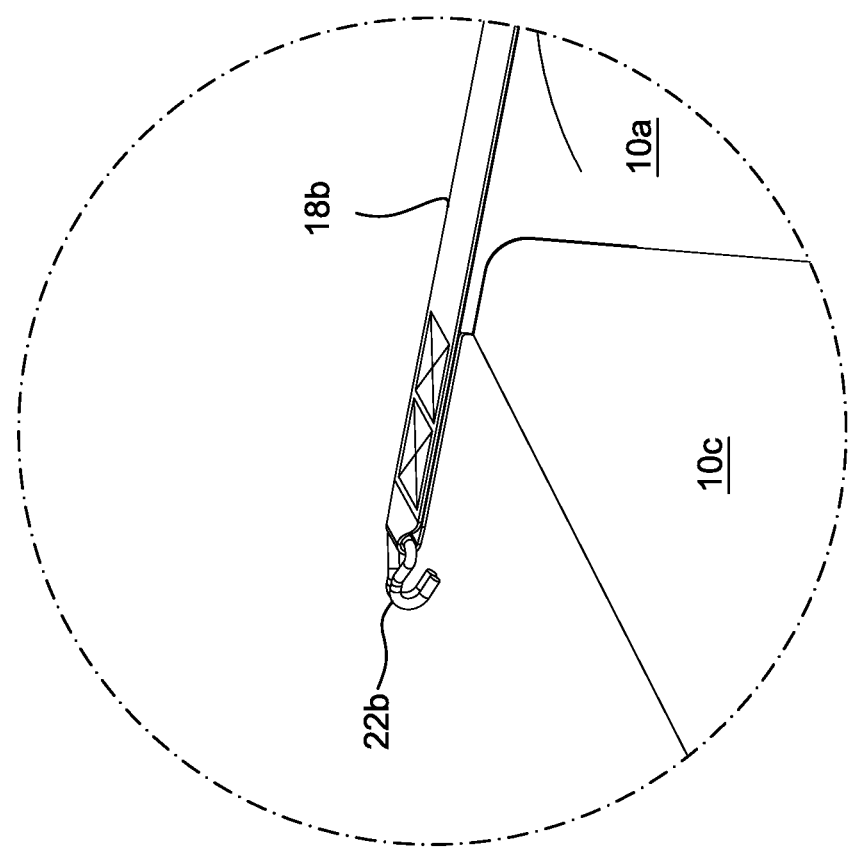
Figure 4D:
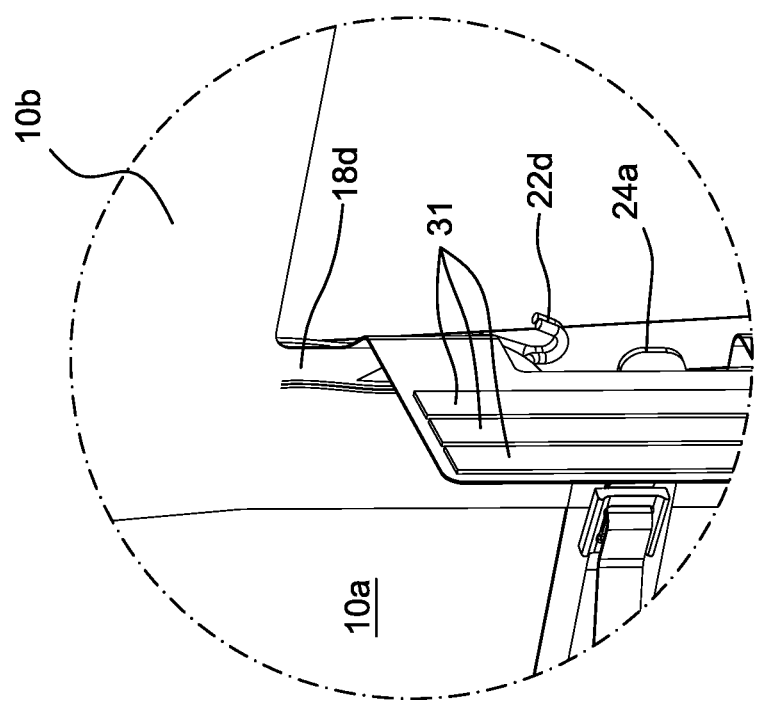
FIGS. 4C-4D are enlarged perspective views of the lower lateral connectors for the thermal barrier curtain shown in FIG. 3.
Figure 4C:
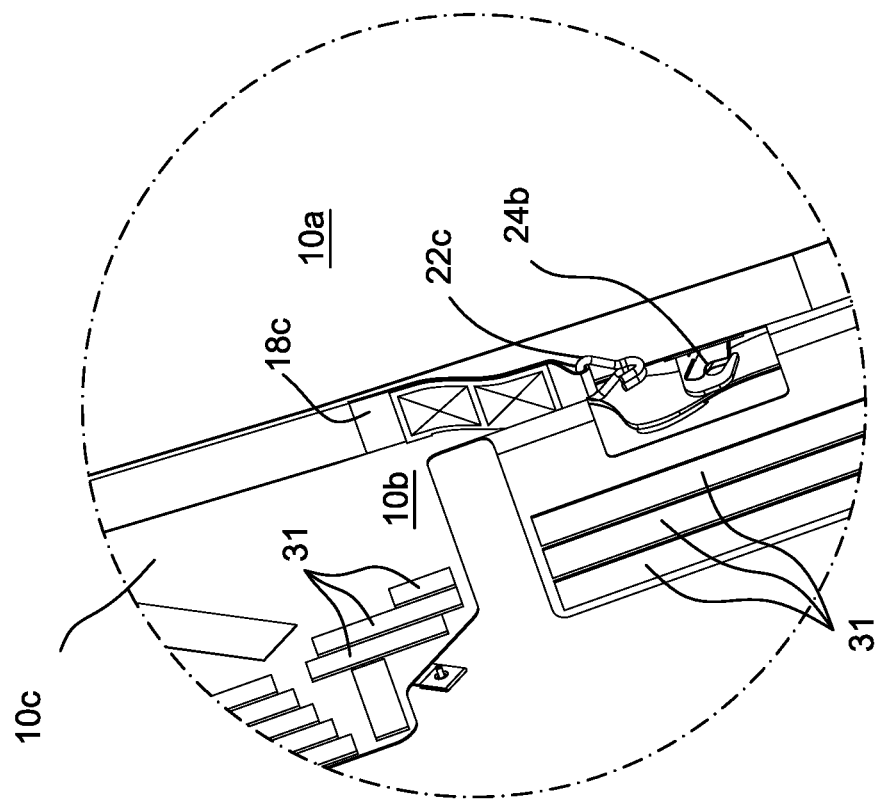

The upper edge of the central air cushion 10a is provided with a contour tape 18 comprised of an upper fabric tape member 18a, 18b and lateral port and starboard fabric tape members 18c, 18d, respectively. The contour tape members 18a-18d are connected connected (e.g., via stitching and/or glue) to a reinforcement fabric 20 (see FIG. 3B) so as to bound the top and side edges of the central air cushion 10a. Each opposed port and starboard end of the upper tape members 18a-18d is provided with respective upper J-hooks 22a, 22b (see FIGS. 4A and 4B, respectively) and lower J-hooks 22c, 22d (see FIGS. 4C and 4D, respectively). Each of the J-hooks 22a, 22b, may be attached in the upper attachment loop 44b (46b) of the anchor/hoist strap 40 (42) (see FIG. 6) and each of the J-Hooks 22c and 22d may be attached to corresponding fixed-position supports mounted to the aircraft spar member (ASM).

The thermal barrier cushion 10 is also provided with several vertically separated horizontal mounting straps 24, 26 and 28 extending widthwise across the central air cushion region 10a and each of the side tab regions 10b, 10c. The opposite ends of each of the mounting straps 24, 26 and 28 are provided with latch hooks 24a, 24b, 26a, 26b and 28a, 28a, respectively. Latch hook 28a is shown in greater detail in FIG. 5A as a representative depiction of all the other latch hooks 24a, 24b, 26a, 26b and 28b. A number of additional side connectors 30a, 30b may be provided with each of the side tab regions 10b, 10c, respectively. A side connector 30a is shown in greater detail in FIG. 5B and is also representative of the side connectors 30b. Each of the latch hooks 24a, 24b, 26a, 26b, 28a and 28b as well as the additional side connectors 30a, 30b (if any) may be attached to corresponding fixed-position clips mounted to the interior fuselage structure AF (e.g., an interior fuselage frame member AFM). Further, as representatively shown in FIGS. 4C and 4D, the side tab 10b (as well as the side tab 10c) may be provided with strips 31 comprised of one part of a conventional two-part hook and loop connector (e.g., VELCRO® brand connectors) with the other part thereof (not shown) being fixed to adjacent aircraft structure.

Figure 6:
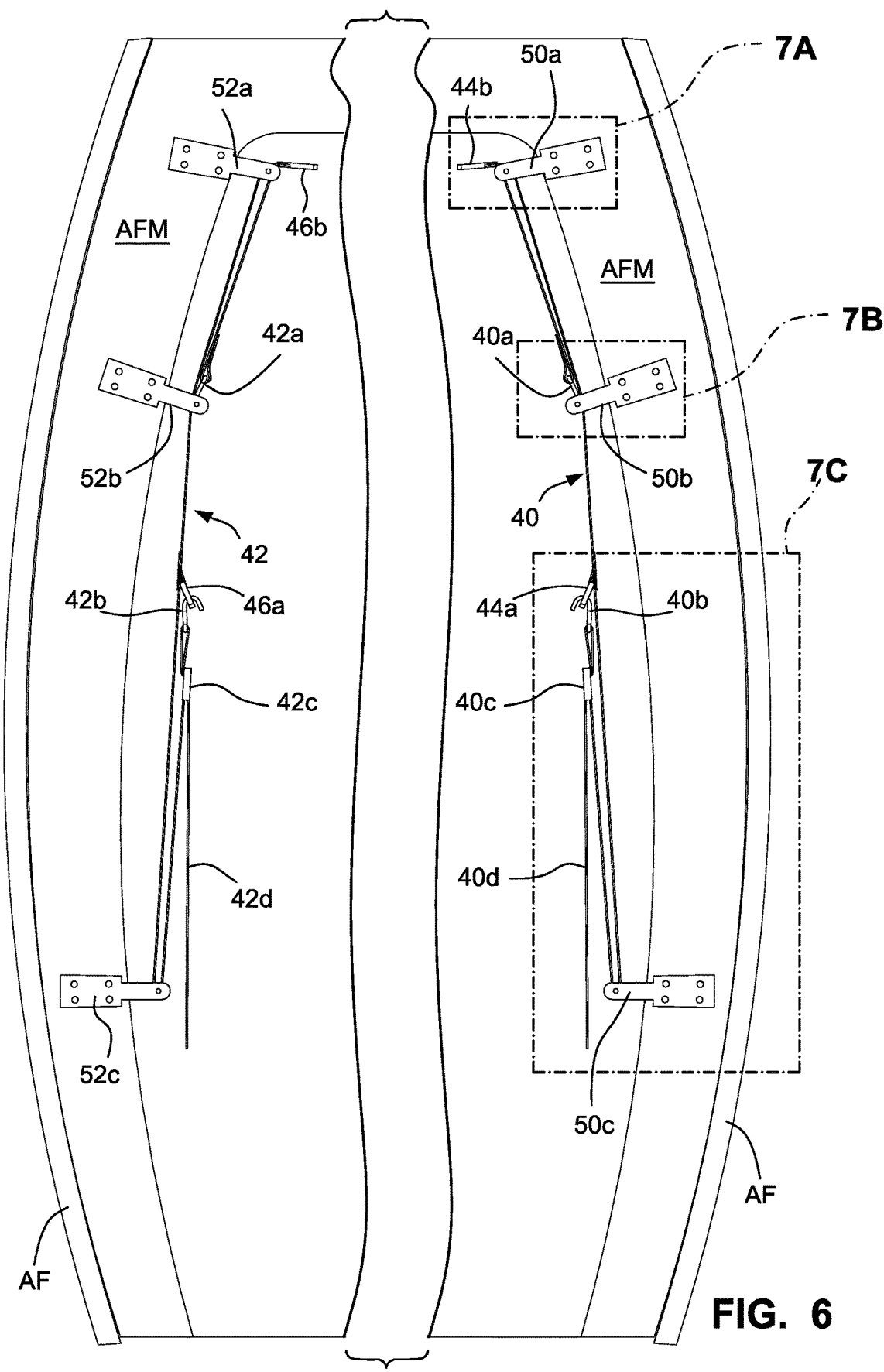
FIG. 6 is an aft-looking elevational view of the lateral port and starboard side anchor/hoist straps which serve to hoist the thermal barrier curtain into position and anchor the curtain to respectively adjacent interior fuselage frame structures of the cargo aircraft.

In order to positionally secure the thermal barrier cushion 10 at the desired location within the cargo space CS, an opposed pair of port and starboard anchor/hoist straps 40, 42 are provided. Accompanying FIG. 6 depicts the port and starboard side anchor/hoist strap 40, 42 that are employed so as to assist on-board personnel to hoist the thermal barrier curtain 10 into position and then anchor the curtain 10 to adjacent aircraft structures, e.g., an adjacent aircraft frame member AFM. As shown in FIG. 6, each of the port and starboard side anchor/hoist straps 40, 42, respectively, is preferably a flexible fabric strap that is sufficiently strong and durable so as to support the weight of the thermal barrier cushion 10 when installed within the cargo space CS and is of sufficient length to allow the thermal barrier cushion 10 to be hoisted into position when deployed. In this regard, the upper and lower terminal ends of the anchor/hoist tape 40, 42 respectively include respective J-hooks 40a, 40b and 42a, 42b and a slidable stretcher element 40c, 42c to allow lengthwise adjustment of the anchor/hoist strap 40, 42 therebetween. The discussion below will be focused on the port side anchor/hoist strap 40 but it will be appreciated that such discussion will apply equally to the starboard side anchor/hoist tape 42 as a mirror image thereof. Where possible in the discussion below, those components of the starboard side anchor/hoist tape 42 that are shown in FIG. 6 and correspond to components of the port side anchor/hoist tape 40 will be parenthetically noted.

Figure 7A:
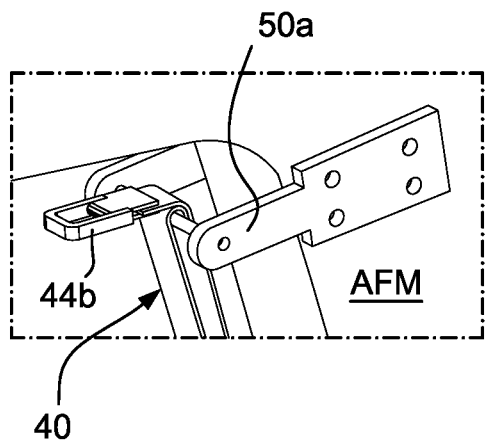
FIGS. 7A-7C are an enlarged views of the upper, intermediate and lower support brackets and their interactions with the lateral port side anchor/hoist strap as depicted in FIG. 6.
Figure 7B:
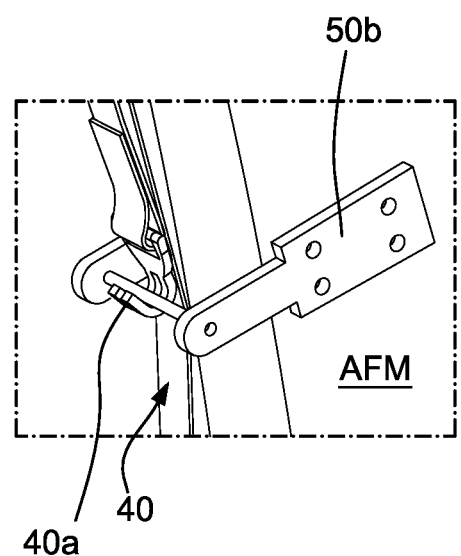
Figure 7C:
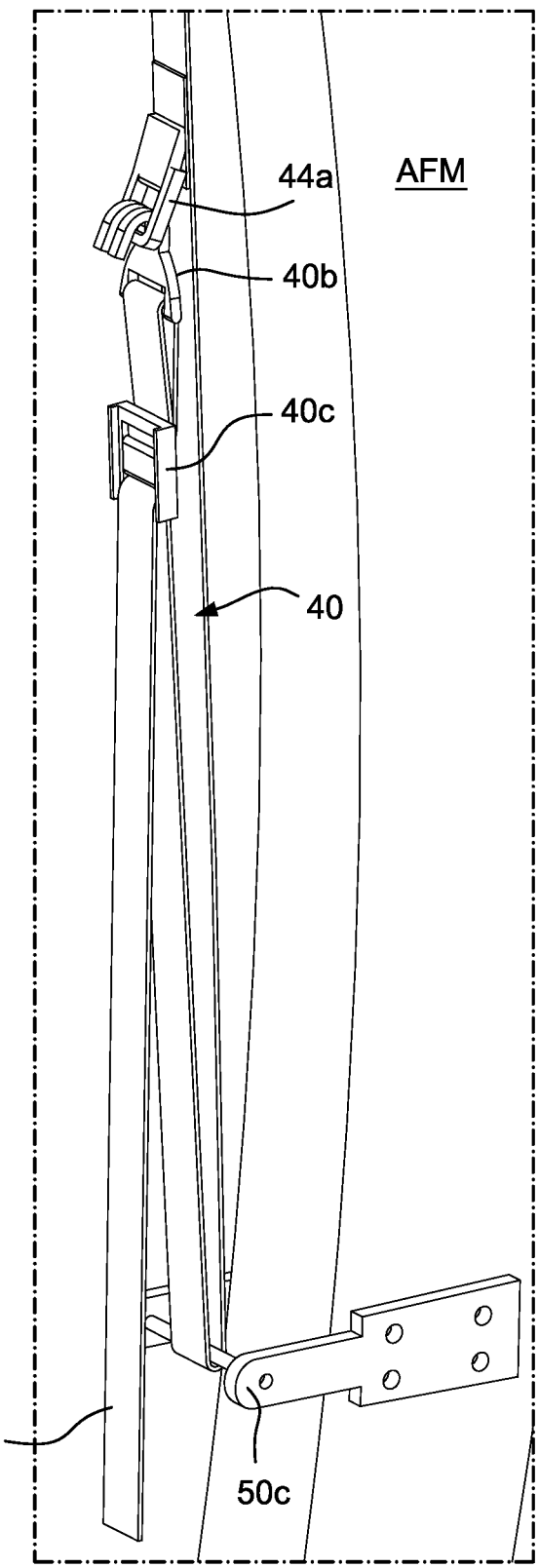
Figure 8:
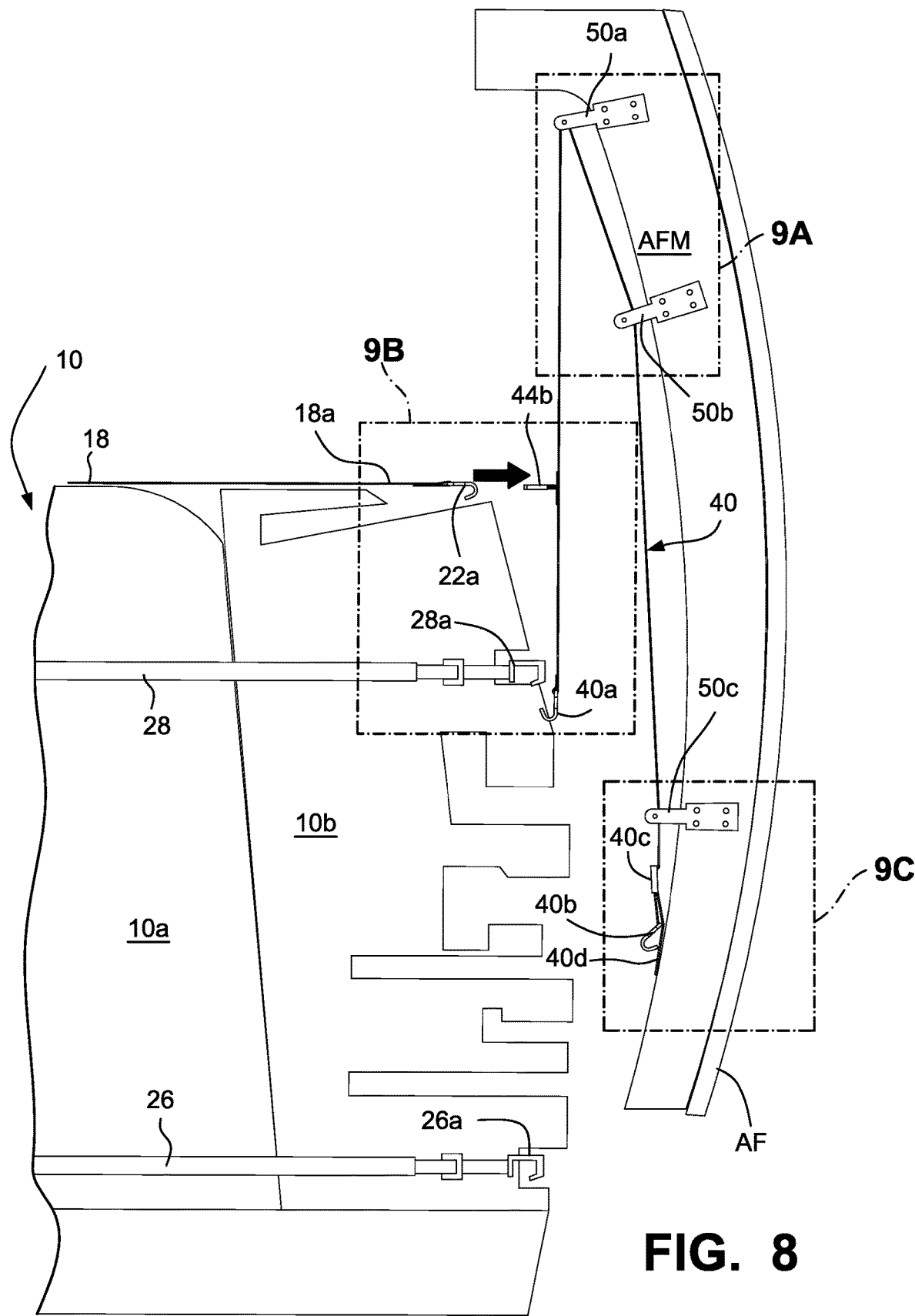
FIG. 8 is a partial aft-facing elevational view of the port side portion of the thermal barrier curtain being prepared for hoisting into position by the lateral port side anchor/hoist strap.
Figure 9A:
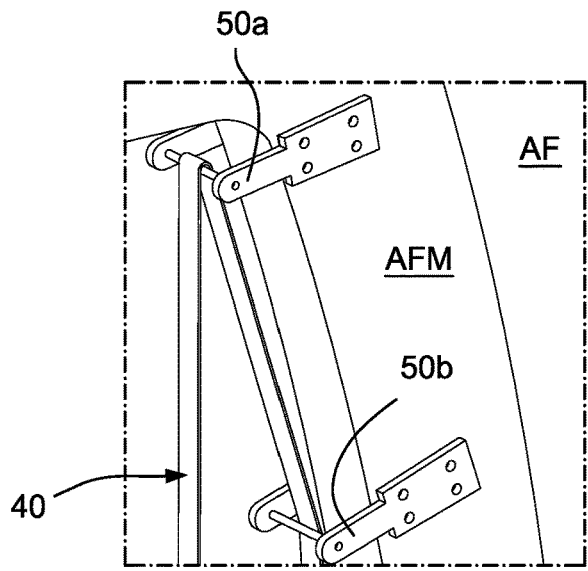
FIGS. 9A-9C are enlarged perspective views of the lateral port side anchor/hoist strap components as shown in FIG. 8.
Figure 9B:
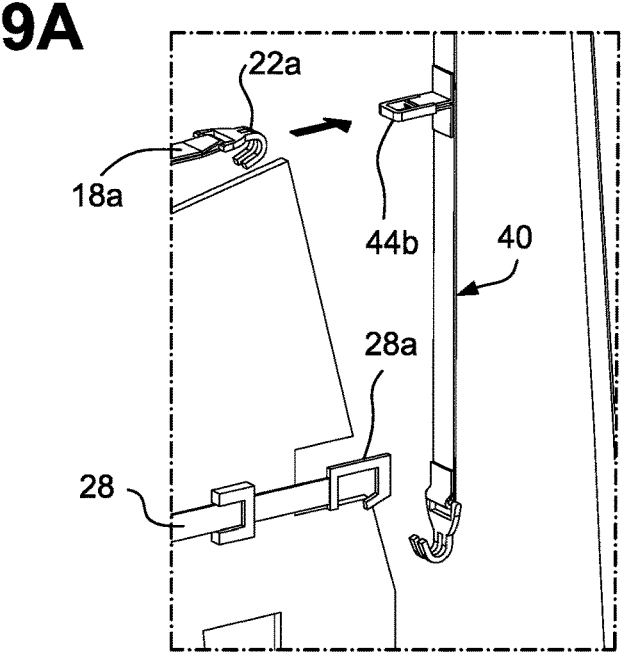
Figure 9C:
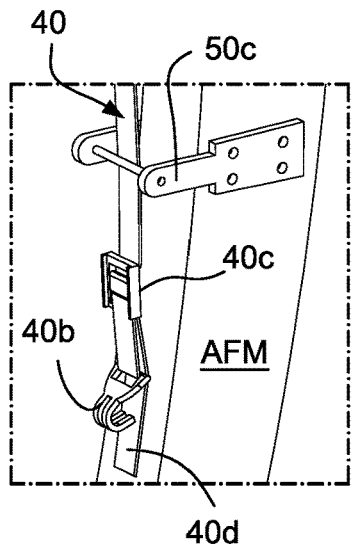
Figure 10:
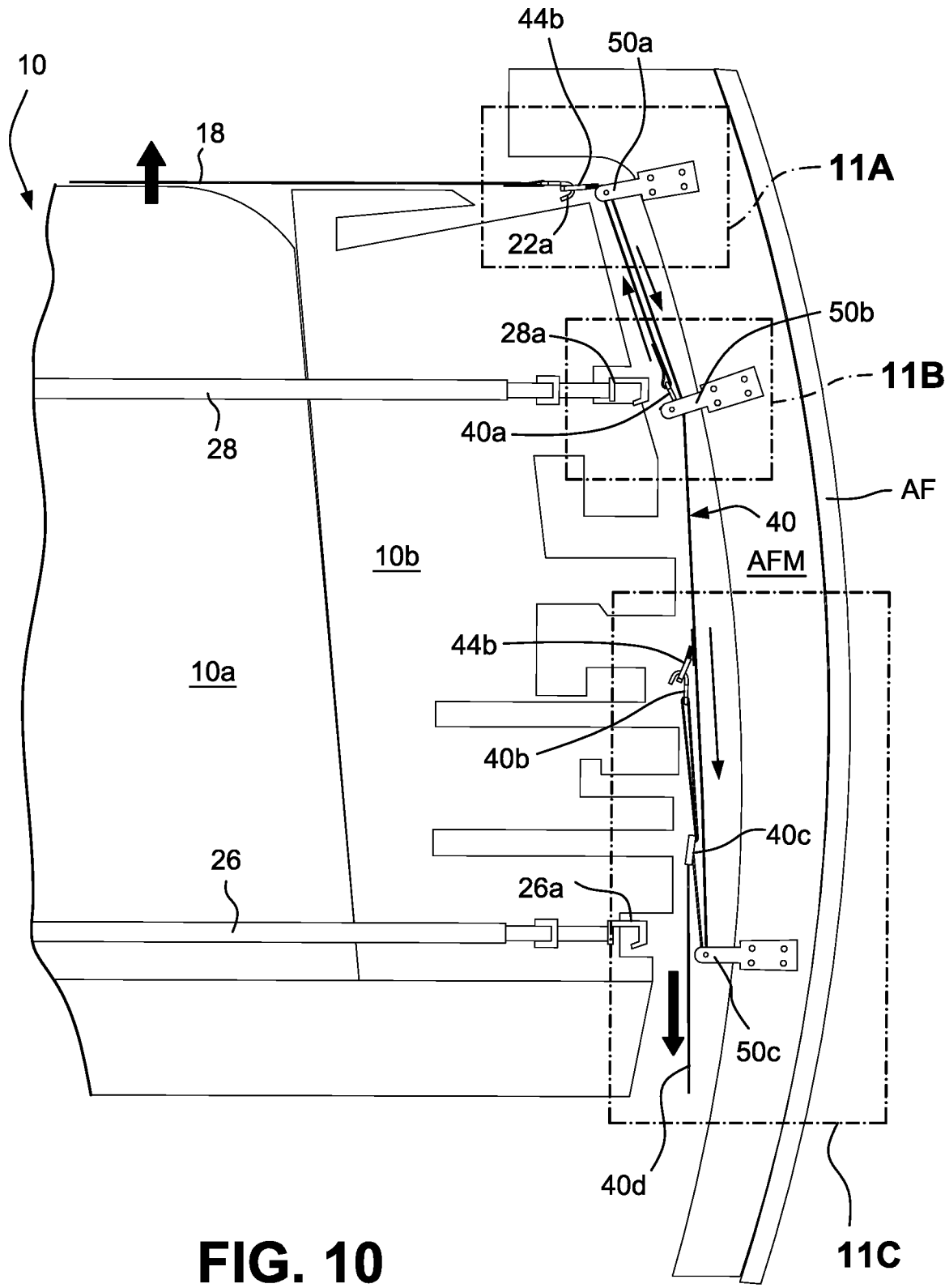
FIG. 10 is a partial aft-facing elevational view of the port side portion of the thermal barrier curtain in a hoisted position with its upper tape secured by the lateral port side anchor/hoist strap.
Figure 11A:
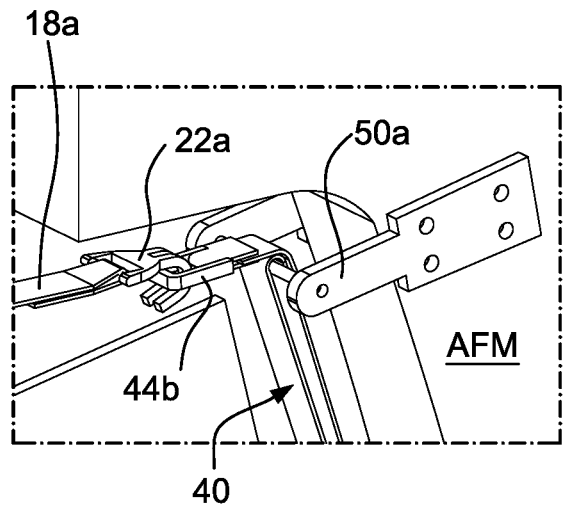
FIGS. 11A-11C are enlarged perspective views of the port side portion of the thermal barrier curtain as shown in FIG. 10.
Figure 11B:
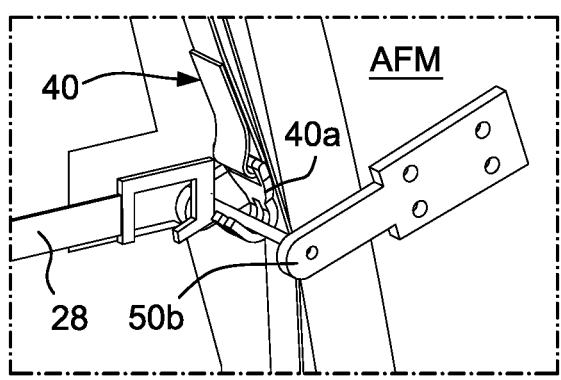
Figure 11C:
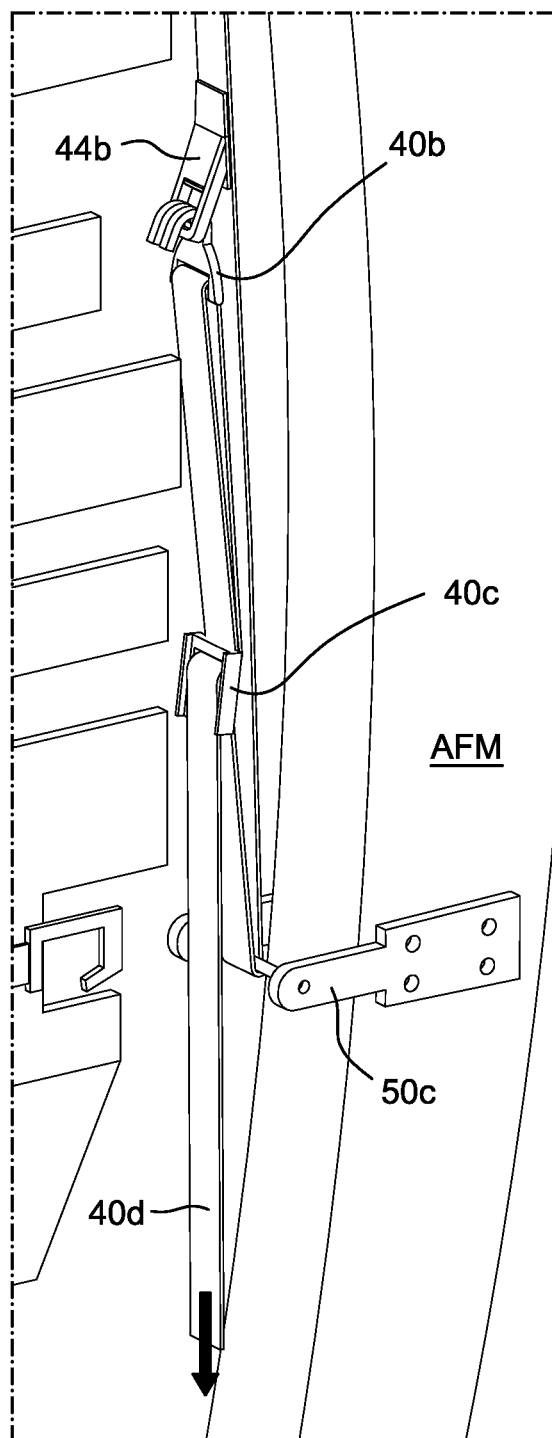

As is shown in FIGS. 7A-7C, when the thermal barrier curtain 10 is not deployed, the upper portion of the anchor/hoist strap 40 (42) is looped around an upper fixed support rod 50a (52a) to allow the J-hook 40a (42a) to be engaged with an intermediate fixed support rod 50b (52b). The lower portion of the anchor/hoist strap 40 (42) will likewise be looped around a lower fixed support rod 50c (52c) to allow the J-hook 40b (42b) to be engaged with an intermediate retaining loop 44a (46a) that is positionally fixed to an intermediate portion of the strap 40 (42). The strap 40 (42) may thus be tensioned by pulling on the strap tail portion 40d (42d) extending from the strap adjuster 40c (42c). When in such a position, the upper attachment loop 44b (46b) of the anchor/hoist strap 40 (42) is positioned near the upper support rod 50a (52a).

When it is desired to deploy the thermal barrier curtain 10 into a hoisted position, the J-hooks 40a, 40b (42a, 42b) may be removed from the support rod 50a (52a) and retaining loop 44a (46a), respectively. This will allow the anchor/hoist strap 40 (42) to be pulled downwardly by the J-hook 40a (42a) until the upper attachment loop 44b (46b) is lowered sufficiently to be accessible by the installation personnel. The J-hook 22a (22b) associated with the upper tape member 18 may then be attached to the upper attachment loop 44b (46b). Such a state is shown in FIGS. 8 and 9A-9C.

The lower end of the anchor/hoist strap 40 (42) may thereafter be pulled by the installation personnel with the strap 40 (42) being looped around the lower support rod 50c (52c) causing the upper attachment loop 44b (46b) to be hoisted into its deployed position whereby the upper attachment loop 44b (46b) is once again located adjacent the upper support rod 50a (52a). Such a state is shown in FIGS. 10 and 11A-11C. Thereafter, the installation personnel may reattach the upper J-hook 40a to the intermediate support rod 50a (52a) as well as to reattach the lower J-hook to the retaining loop 44a (46a) with the strap 40 (42) being looped around the lower support rod 50c (52c) so the strap assumes the state shown in FIG. 6 with the exception that the upper tape member 18 of the curtain 10 is attached to the upper attachment loop 44b (46) via the J-hook 22a (22b). Any slack in the anchor/hoist strap 40 may be taken up so as to properly tension the strap 40 by the installation personnel pulling on the tail portion 40d extending from the strap adjuster 40c. Each of the upper attachment loop 44b (46b) and the intermediate retaining loop 44a (46a) is most preferably a fabric, metal or plastic loop that is positionally fixed to the elongate anchor/hoist strap 40 (42).

A similar installation procedure to that described hereinabove would therefore also be conducted substantially simultaneously or sequentially for the opposite starboard side of the thermal barrier cushion 10 using the starboard side anchor/hoist tape 42 and its associated components. Removal of the thermal barrier curtain 10 to allow storage for future use would proceed in reverse to the steps described above for its installation and deployment.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A thermal barrier curtain system to provide a thermal barrier within an interior cargo space of a cargo aircraft, wherein the thermal barrier curtain system comprises a thermal barrier curtain and port and starboard anchor/hoist strap assemblies, wherein
   (1) the thermal barrier curtain comprises:
      forward and aft flexible air-impervious panels which are sealed about peripheral edges thereof so as to define a central thermal barrier region;
      separator elements positioned between and attached to the forward and aft panels within the central thermal barrier region so as to define a dead air space therebetween;
      an upper contour tape attached to an upper edge of the forward and aft panels; and
      port and starboard connection elements associated with port and starboard terminal ends of the upper contour tape, wherein
   (2) each of the port and starboard anchor/hoist strap assemblies comprises:
      an elongate strap of sufficient length corresponding to a height dimension of the thermal barrier curtain and adapted to being positionally attached to adjacent structure of the aircraft;
      upper and lower attachment members positioned at opposed upper and lower ends of the elongate strap,
      an upper attachment loop fixed to the elongate strap near the upper attachment member which is adapted to receive and be attached to a respective one of the port and starboard connection elements of the thermal barrier curtain; and an intermediate retaining loop attached to the elongate strap between the upper attachment loop and the lower attachment member which is adapted to receive and be attached to the lower attachment member of the anchor/hoist assembly.

2. The thermal barrier curtain system according to claim 1, wherein the thermal barrier curtain further comprises port and starboard tab regions joined to port and starboard sides of the forward and aft flexible air-impervious panels adjacent to port and starboard edges of the central thermal barrier region thereof, respectively.

3. The thermal barrier curtain system according to claim 2, wherein each of the port and starboard connection elements comprise port and starboard J-hooks, respectively.

4. The thermal barrier curtain system according to claim 1, wherein each of the forward and aft flexible air-impervious panels is comprised of an elastomeric polymer material impregnated within, laminated to or coated onto one or more fabric layers.

5. The thermal barrier curtain system according to claim 4, wherein the each of the separator elements is comprised of an elastomeric foam material.

6. The thermal barrier curtain system according to claim 1, wherein each of the port and starboard anchor/hoist strap assemblies further comprise a strap adjuster which joins respective sections of the elongate strap to one another near the lower attachment member so as to establish a strap tail that allows length adjustment of the elongate strap.

7. The thermal barrier curtain system according to claim 1, wherein the elongate strap is a flexible fabric strap of sufficient strength to support weight of the thermal barrier curtain.

8. The thermal barrier curtain system according to claim 1, wherein each of the upper attachment loop and the intermediate retaining loop is a fabric, metal or plastic loop fixed to the elongate strap.

9. A cargo aircraft which includes the thermal barrier curtain system according to claim 1.

10. The cargo aircraft according to claim 9, wherein the thermal barrier curtain is positioned transversely within an interior pressurized fuselage space of the cargo aircraft.

11. The cargo aircraft according to claim 10, wherein the cargo aircraft includes an aft cargo ramp door and an oppositely facing articulated aft cargo door defining a junction therebetween, and wherein the thermal barrier curtain is positioned at the junction between the aft cargo ramp door and the aft cargo door.

* * * * *